(12) United States Patent
Yano

(10) Patent No.: US 12,452,043 B2
(45) Date of Patent: Oct. 21, 2025

(54) KEY SHARING METHOD, KEY SHARING SYSTEM, AUTHENTICATION DEVICE, AUTHENTICATION TARGET DEVICE, RECORDING MEDIUM, AND AUTHENTICATION METHOD

(71) Applicant: DAI NIPPON PRINTING CO., LTD., Tokyo (JP)

(72) Inventor: Yoshihiro Yano, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 308 days.

(21) Appl. No.: 18/023,756

(22) PCT Filed: Aug. 31, 2021

(86) PCT No.: PCT/JP2021/031813
§ 371 (c)(1),
(2) Date: May 9, 2023

(87) PCT Pub. No.: WO2022/050241
PCT Pub. Date: Mar. 10, 2022

(65) Prior Publication Data
US 2023/0269078 A1    Aug. 24, 2023

(30) Foreign Application Priority Data
Sep. 2, 2020   (JP) .................. 2020-147722

(51) Int. Cl.
*H04L 9/08*         (2006.01)
(52) U.S. Cl.
CPC ............ *H04L 9/085* (2013.01); *H04L 9/0825* (2013.01); *H04L 9/0861* (2013.01)
(58) Field of Classification Search
CPC ..... H04L 9/085; H04L 9/0825; H04L 9/0861; H04L 9/0838; H04L 63/0435;
(Continued)

(56) References Cited

U.S. PATENT DOCUMENTS 7,302,572 B2 * 11/2007 Shinriki ................ G06F 21/445
                                                      713/168
8,892,865 B1   11/2014 Roth et al.
(Continued)

FOREIGN PATENT DOCUMENTS

JP     H05-22283 A      1/1993
JP     2005-123888 A    5/2005
(Continued)

OTHER PUBLICATIONS

Nov. 16, 2021 International Search Report issued in International Patent Application No. PCT/JP2021/031813.
(Continued)

*Primary Examiner* — J. Brant Murphy
(74) *Attorney, Agent, or Firm* — Oliff PLC

(57) ABSTRACT

A key sharing method between the authentication device and the authentication target device. The authentication device shares sharing information with the authentication target device in advance, one of the authentication device and the authentication target device shares a generation value generated by a predetermined method with the other of the authentication device and the authentication target device, and each of the authentication device and the authentication target device generates a plurality of pieces of first distribution information from the sharing information by using generation value with a predetermined encoding method capable of restoring data before distribution by arranging all or a part of a plurality of pieces of distribution data obtained by distributing the data before distribution, and shares one piece of first distribution information among the plurality of pieces of first distribution information or derivation information derived from the one piece of first distribution information as a common key.

18 Claims, 11 Drawing Sheets

(58) Field of Classification Search
CPC ... H04L 2209/84; H04L 63/061; H04L 63/08; G06F 21/44; G06F 21/62
See application file for complete search history.

(56) References Cited

U.S. PATENT DOCUMENTS

| | | | |
|---|---|---|---|
| 2014/0025948 A1* | 1/2014 | Bestler | H04L 9/0863 713/167 |
| 2016/0062918 A1* | 3/2016 | Androulaki | H04L 9/0861 713/193 |
| 2017/0005792 A1 | 1/2017 | Rietman et al. | |

FOREIGN PATENT DOCUMENTS

| | | |
|---|---|---|
| JP | 2005-244534 A | 9/2005 |
| JP | 2006-203364 A | 8/2006 |
| JP | 2016-529753 A | 9/2016 |

OTHER PUBLICATIONS

Nov. 16, 2021 Written Opinion issued in International Patent Application No. PCT/JP2021/031813.

* cited by examiner

KEY SHARING METHOD, KEY SHARING SYSTEM, AUTHENTICATION DEVICE, AUTHENTICATION TARGET DEVICE, RECORDING MEDIUM, AND AUTHENTICATION METHOD

CROSS-REFERENCE TO RELATED APPLICATIONS

This application is the national phase under 35 U.S.C. § 371 of PCT International Application No. PCT/JP2021/031813 which has an International filing date of Aug. 31, 2021 and designated the United States of America.

FIELD

The present disclosure relates to a key sharing method, a key sharing system, an authentication device, an authentication target device, a recording medium, and an authentication method.

BACKGROUND

In recent, security issues have gradually become apparent, and there is an increasing need to protect communication for information transmission and reception between various devices such as mobile devices, servers and clients, IoT devices, personal computers and external recording devices, electronic control units (ECUs) and sensor groups in vehicles. For this reason, a cryptographic technology is used to cope with security issues.

Japanese Patent Laid-Open Publication No. 2005-123888 discloses a public key infrastructure (PKI) as a security infrastructure that uses a public key cryptosystem capable of transmitting and receiving a common key for data encryption by using a key pair of a public key and a private key.

SUMMARY

The public key infrastructure uses a public key cryptosystem that performs encryption with a public key and performs decryption with a private key. However, in the public key cryptosystem, typically, processing is heavier than a common key cryptosystem, and thus there are limitations such as a long processing time, and applications only in devices with large processing capability.

In addition, in the public key infrastructure, even though a common key is encrypted, since the common key is exchanged through a communication channel, a risk of leakage or illegal acquisition exists.

The disclosure has been made in consideration of such circumstances, and provides a key sharing method, a key sharing system, an authentication device, an authentication target device, a recording medium, and an authentication method which are capable of sharing a common key without using a public key infrastructure.

The present application includes a plurality of kinds of means for solving the problem, and as one example, there is provided a key sharing method between an authentication device and an authentication target device. The authentication device shares sharing information with the authentication target device in advance, one of the authentication device and the authentication target device shares a generation value generated by a predetermined method with the other of the authentication device and the authentication target device, and each of the authentication device and the authentication target device generates a plurality of pieces of first distribution information from the sharing information by using the generation value with a predetermined encoding method capable of restoring data before distribution by arranging all or a part of a plurality of pieces of distribution data obtained by distributing the data before distribution, and shares one piece of first distribution information among the plurality of pieces of first distribution information or derivation information derived from the one piece of first distribution information as a common key.

According to the disclosure, the common key can be shared without using the public key infrastructure.

The above and further objects and features of the invention will more fully be apparent from the following detailed description with accompanying drawings.

BRIEF DESCRIPTION OF THE DRAWINGS

Hereinafter, an embodiment of the disclosure will be described. FIG. 1 is a schematic view illustrating an example of a configuration of a key sharing system of this embodiment. The key sharing system includes an authentication target device 10 and an authentication device 50. Note that, in FIG. 1, only one authentication target device 10 and only one authentication device 50 are illustrated, but a plurality of the authentication target devices 10 and a plurality of the authentication devices 50 may be provided. A communication channel 1 is provided between the authentication target device 10 and the authentication device 50. As to be described later, when the authentication target device 10 and the authentication device 50 share a common key, a confidential communication channel can be provided between the authentication target device 10 and the authentication device 50.

Figure 1:
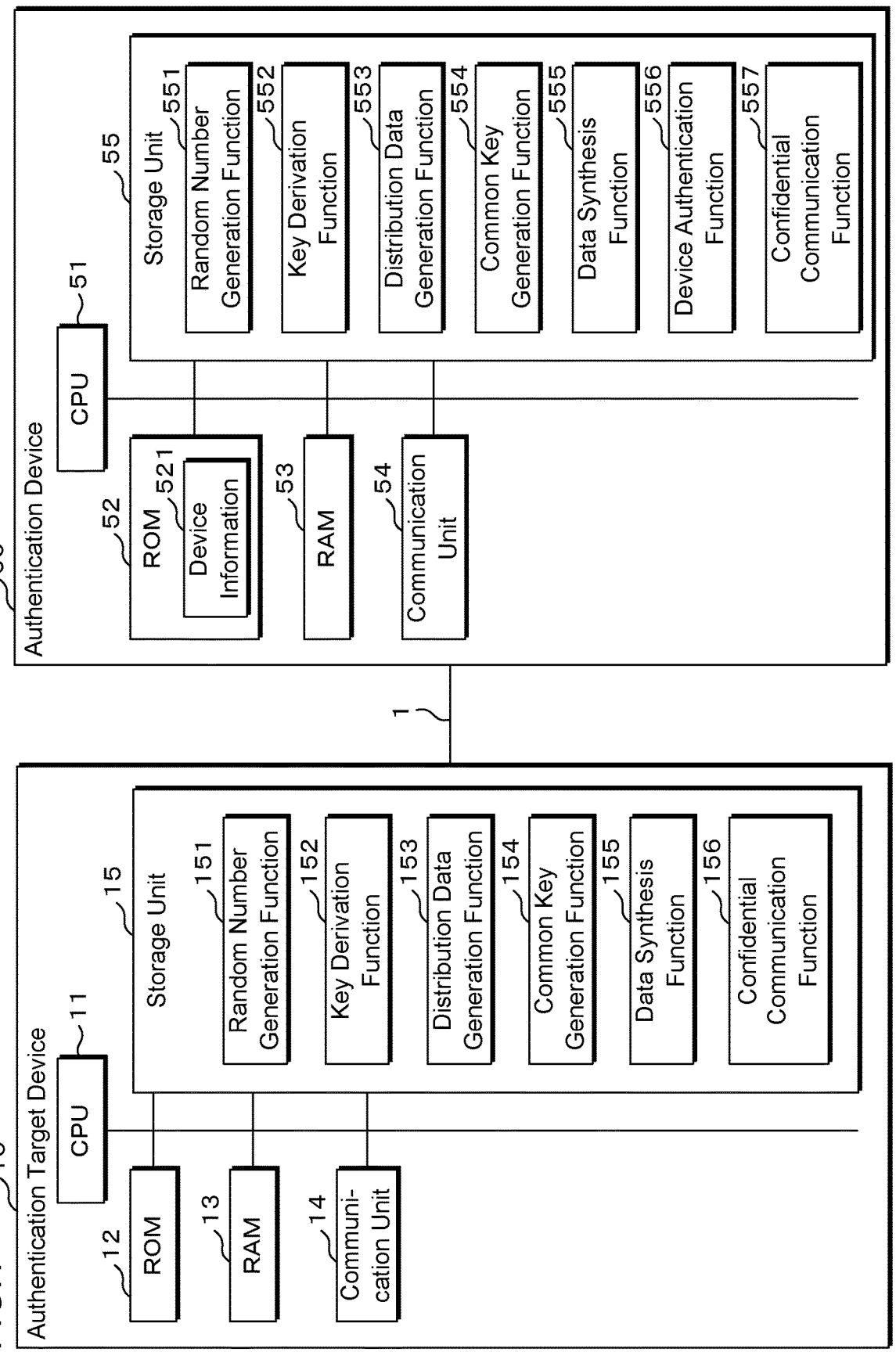
FIG. 1 is a schematic view illustrating an example of a configuration of a key sharing system of an embodiment.

The authentication device 50 is a device that authenticates the authentication target device 10, and the authentication target device 10 is a device to be authenticated. The key sharing system of this embodiment is applicable to various devices in authentication and key sharing during mobile communication, authentication and key sharing between a server and a client, authentication and key sharing during communication between IoT devices or between IoT devices and a management device, authentication and key sharing between a personal computer (PC) and an external device (for example, a universal serial bus (USB) device, or the like), authentication and key sharing between electronic control units (ECUs) and a sensor group or between ECUs in a vehicle, and the like. For example, the authentication target device 10 can be home appliances such as a client PC, a smartphone, a tablet, and an air conditioner. For example, the authentication device 50 can be a rooter, a gateway device, a terminal device, a server, or the like.

The authentication device 50 includes a central processing unit (CPU) 51 that controls the entirety of a device, a read only memory (ROM) 52, a random access memory (RAM) 53, a communication unit 54, and a storage unit 55. The storage unit 55 is a non-volatile recording memory, and can be constituted, for example, by a semiconductor memory, a hard disk, or the like. A computer program is recorded on the storage unit 55, and the computer program has functions such as a random number generation function 551, a key derivation function 552, a distribution data generation function 553, a common key generation function 554, a data synthesis function 555, a device authentication function 556, a confidential communication function 557, and the like. Note that, each of the functions may be realized by hardware. Each of the functions can be executed by reading out the computer program into the RAM 53 and by executing the computer program developed in the RAM 53 by the CPU 51.

For example, the ROM 52 can be constituted by an electrically erasable programmable read-only memory (EE-PROM), a flash memory, or the like. Device information 521 (for example, a file (X)) is stored in the ROM 52. The device information 521 includes specific information specific to the authentication device. For example, the specific information may be a device manufacturing number, a device ID, or the like.

The authentication device 50 can acquire the device information 521 from an external server (not illustrated) and can store the device information 521 in the ROM 52. For example, when a plurality of the authentication devices 50 are collectively managed by the external server, and the device information 521 is updated as necessary, the authentication devices 50 can acquire the latest device information 521. According to this, insecurity of the device information 521 can be prevented.

The communication unit 54 is constituted by a required communication module and the like, and provides a communication function with the authentication target device 10 through the communication channel 1.

The random number generation function 551 generates a random number (R) as a generation value. The random number generation function 551 can generate a different random number (R) whenever the random number is generated.

The key derivation function 552 can generate a derivation value (R') by using a predetermined derivation method with respect to the random number (R) generated by the random number generation function 551. As the derivation method, an appropriate method can be used. For example, a hash value obtained by performing a hash operation with respect to the random number (R) may be set as the derivation value (R'), a predetermined value may be added to the random number (R), or a hash value obtained by performing the hash operation with respect to a value obtained by adding a predetermined value to the random number (R) may be set as the derivation value (R'). The derivation method is not limited to the methods. In the authentication device 50 and the authentication target device 10, the same derivation method is employed.

The distribution data generation function 553 can generate a plurality of distribution files from a file before distribution by using an encryption key. Note that, the "encryption key" is a key different from a private key in the public key infrastructure. The distribution data generation function 553 can generate a plurality of distribution files (for example, file (Xa) and a file (Xb)) from the device information 521 (file (X)) by using an encryption key. One distribution file (for example, the file (Xa)) among the plurality of distribution files can be shared with the authentication target device 10 as sharing information. Specifically, the authentication device 50 transmits one distribution file (file (Xa)) to the authentication target device 10 through the communication unit 54.

According to this, the authentication device 50 and the authentication target device 10 can have the file (Xa) in advance. For example, as a sharing method of the file (Xa), an appropriate method can be used in correspondence with a security level of the authentication device 50 and the authentication target device 10, a security policy, and the like.

In addition, the distribution data generation function 553 can generate a distribution file (for example, two files (Xaa and Xab)) as a plurality of pieces of first distribution information from the file (Xa) as the sharing information by using a predetermined encoding method with the random number (R) or the derivation value (R') set as an encryption key. The predetermined encoding method is a method that can restore data before distribution by arranging all or a part of a plurality of pieces of distribution data obtained by distributing the data before distribution, and the same encoding method is employed in the authentication device 50 and the authentication target device 10.

Figure 2:
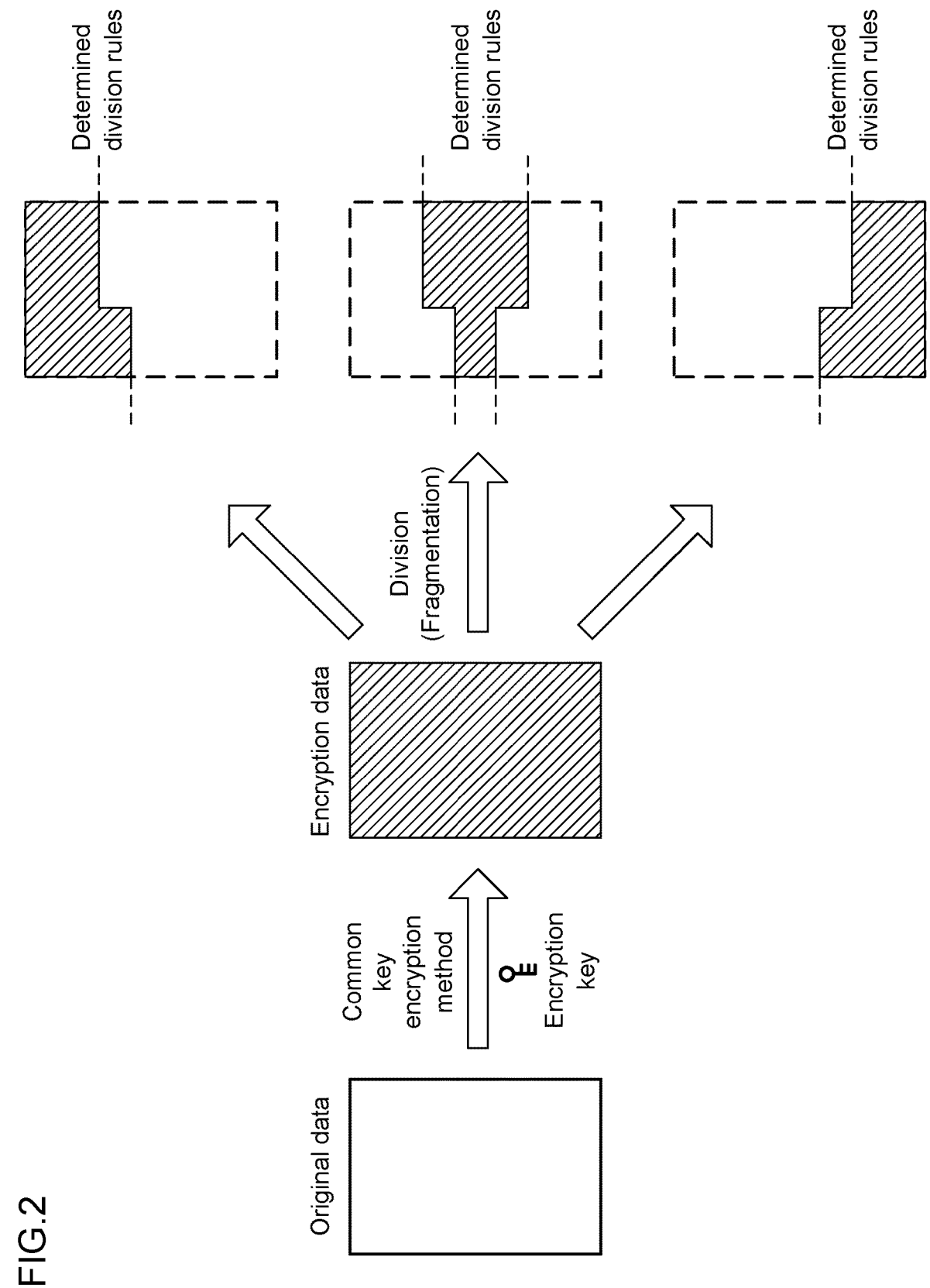
FIG. 2 is a schematic view illustrating a first example of a distribution file generation method.

FIG. 2 is a schematic view illustrating a first example of a distribution file generation method. In the first example, as illustrated in FIG. 2, original data is encrypted by a common key encryption method by using an encryption key. As an encryption algorithm, for example, data encryption standard (DES), advanced encryption standard (AES), or the like can be used. The encryption key that is used in the common key encryption method is embedded in encryption data. Next, the encryption data is divided (fragmented) into a plurality of pieces of data. Which part of the encryption data is to be divided in which manner (division method) may be determined in advance. In the example in FIG. 2, the encryption data is divided into three files, but the number of divisions is not limited to three, and may be 2 or four or more. The encryption data can be divided into a required number of files. A size of the original data can be appropriately determined, but the larger the size of the data is, the more decryption is difficult. Accordingly, the size of the original data is preferably set to be large. Note that, in the example in FIG. 2, division is performed after encryption, but there is no limitation thereto. After the original data is divided, each divided data may be encrypted.

Each post-division file (distribution file) as first distribution information becomes a meaningless binary string. Even though one post-division file among a plurality of post-division files is leaked or illegally acquired, the leaked or illegally acquired post-division file becomes meaningless data, and another post-division file (that is not leaked or illegally acquired) cannot be analogized from the leaked or illegally acquired post-division file. According to this, key sharing security can be improved as to be described later.

Figure 3:
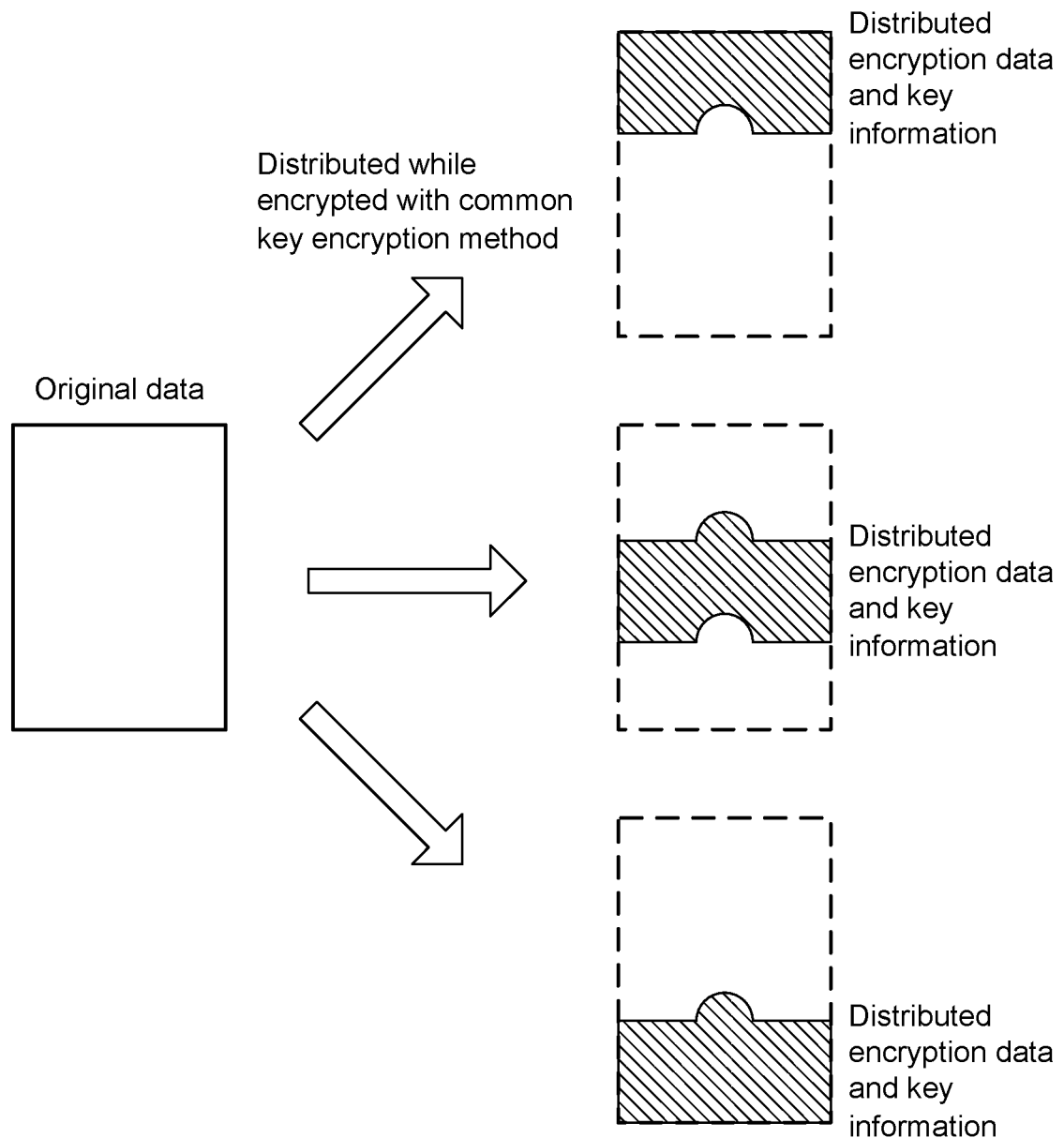
FIG. 3 is a schematic view illustrating a second example of the distribution file generation method.

FIG. 3 is a schematic view illustrating a second example of the distribution file generation method. The second example uses a so-called secret distribution method, and original data is distributed into a plurality of distribution files while being encrypted by a common key encryption method as illustrated in FIG. 3. As an encryption algorithm, for example, DES, AES, or the like can be used. An encryption key that is used in the common key encryption method is also distributed, and each distributed encryption key is embedded in each of the plurality of distribution files, and thus it is not necessary to manage the key. In addition, whenever the secret distribution is performed, the number of distribution or a distribution ratio can be appropriately changed. In the example of FIG. 3, the original data is distributed into three files. However, the number of distributions is not limited to three, and may be two or four or more, and the original data can be distributed into a required number of files. A size of the original data can be appropriately determined, but the larger the size of the data is, the more decryption is difficult. Accordingly, the size of the original data is preferably set to be large.

Each distribution file as first distribution information becomes a meaningless binary string. Even though one distribution file among a plurality of distribution files is leaked or illegally acquired, the leaked or illegally acquired distribution file becomes meaningless data, and another distribution file (that is not leaked or illegally acquired) cannot be analogized from the leaked or illegally acquired distribution file. According to this, key sharing security can be improved as to be described later. The post-division file (distribution file) obtained by the method illustrated in FIG. 2 or FIG. 3 is also referred to as distribution data. That is, the distribution data is each data (post-division file) obtained by encrypting the original data and dividing encrypted data by a predetermined division method, or represents a distribution file obtained by a predetermined secret distribution method.

The common key generation function 554 generates a common key from one distribution file (for example, a file (Xab)) among a plurality of distribution files (for example, a file (Xaa) and a file (Xab)) generated by the distribution data generation function 553. With regard to a key derivation algorithm for generating a common key from one distribution file, in a case where an algorithm agreement is made between the authentication target device 10 and the authentication device 50, any algorithm may be used. For example, with respect to one distribution file (file (Xab)), various methods such as using of a unidirectional hash function such as SHA-256 can be used.

In addition, the common key generation function 554 can generate a plurality of different common keys from one distribution file. In this case, the common key can be changed for every session from establishment of communication between the authentication target device 10 and the authentication device 50 to termination of communication therebetween. According to this, communication confidentiality and security can be further improved. The order of using a changed common key may be identified between the authentication target device 10 and the authentication device 50.

The data synthesis function 555 can synthesize a plurality of files. With regard to file synthesis, in a case where files are considered as binary strings, a plurality of files may be synthesized by simply connecting the files, or one file may be divided into a predetermined number of binary strings and the binary strings may be embedded in another files for synthesis. As a file synthesis method, various methods can be employed.

The device authentication function 556 authenticates the authentication target device 10 so as to determine whether or not the authentication target device 10 is a normal device. Details of an authentication method will be described later.

The confidential communication function 557 is a function for performing confidential communication between the authentication device 50 and the authentication target device 10. Specifically, the confidential communication function 557 encrypts required data by using a common key generated by the common key generation function 554, and transmits the encrypted data to the authentication target device 10. In addition, the confidential communication function 557 decrypts the encrypted data transmitted from the authentication target device 10 by using the common key generated by the common key generation function 554. In addition, the confidential communication function 557 manages a session from establishment of communication to termination of communication.

The authentication target device 10 includes a CPU 11 that controls the entirety of the device, a ROM 12, a RAM 13, a communication unit 14, and a storage unit 15. The storage unit 15 is a non-volatile recording medium, and can be constituted by, for example, a semiconductor memory, a hard disk, or the like. A computer program is recorded on the storage unit 15, and the computer program has functions such as a random number generation function 151, a key derivation function 152, a distribution data generation function 153, a common key generation function 154, a data synthesis function 155, and a confidential communication function 156. Note that, each of the functions may be realized by hardware. Each of the functions can be executed by reading out the computer program into the RAM 13 and by executing the computer program developed in the RAM 13 by the CPU 11.

The communication unit 14 is constituted by a required communication module or the like, and provides a communication function with the authentication device 50 through the communication channel 1.

The random number generation function 151 can realize the same function as in the random number generation function 551. Generation of a random number (R) may be performed by either the authentication target device 10 or the authentication device 50. Generation of the random number (R) by either the authentication target device 10 or the authentication device 50 may be determined in advance. Typically, the authentication target device 10 may have a lower CPU processing capability and a smaller memory capacity, and may not have a higher function in comparison to the authentication device 50, and thus the random number generation function 151 may not be provided. In this specification, description will be given on the assumption that the authentication device 50 generates the random number (R).

The key derivation function 152, the distribution data generation function 153, the common key generation function 154, the data synthesis function 155, and the confidential communication function 156 can realize the same function as in the key derivation function 552, the distribution data generation function 553, the common key generation function 554, the data synthesis function 555, and the confidential communication function 557.

Next, description will be given of processing by the authentication device 50 and the authentication target device 10.

Figure 4:
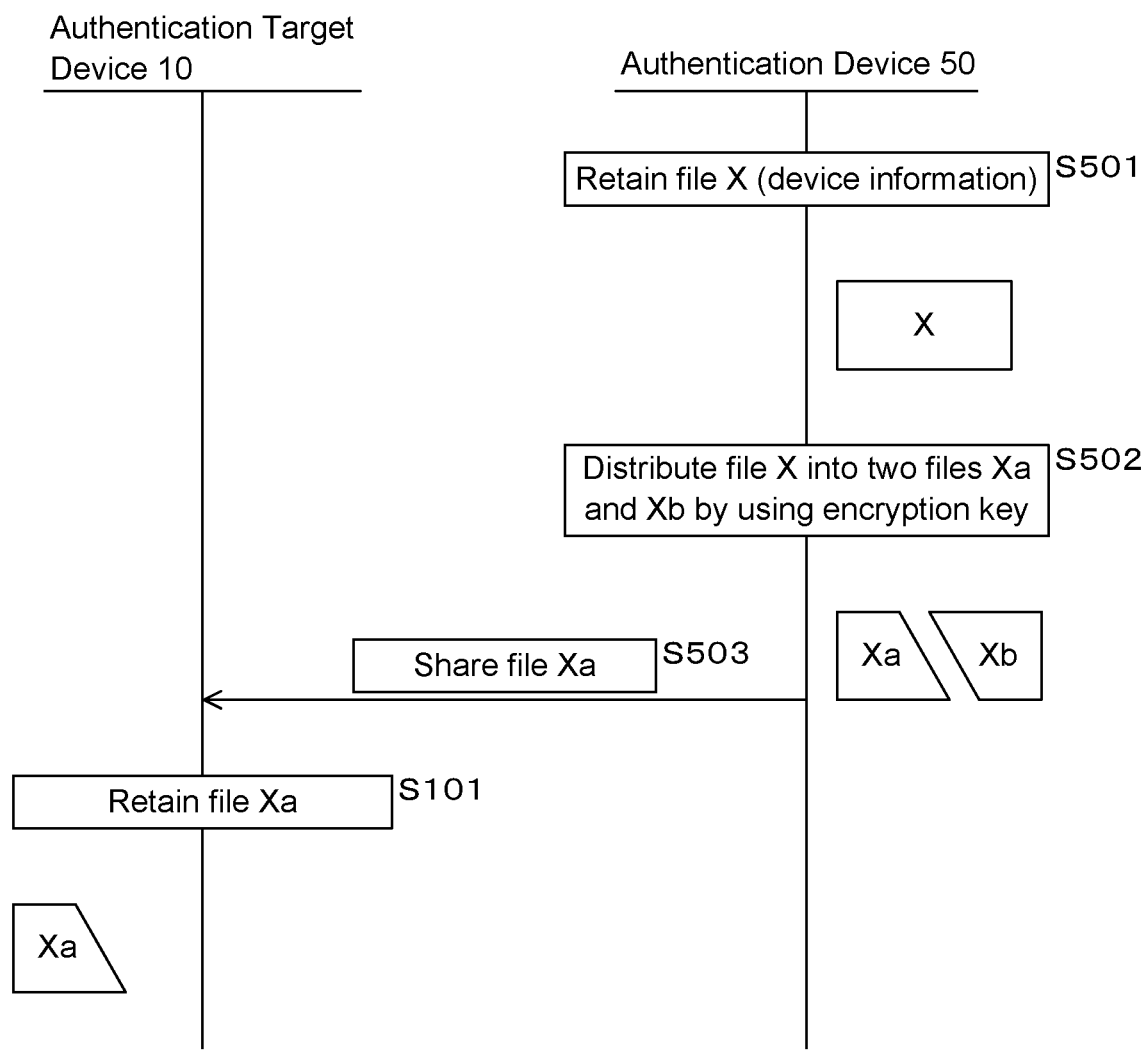
FIG. 4 is a flowchart illustrating an example of a sharing method of a file Xa as sharing information.

FIG. 4 is a flowchart illustrating an example of a sharing method of a file (Xa) as sharing information. The authentication device 50 retains a file (X) (S501). The file (X) can be referred to as the device information 521. Since the file (X) includes specific information specific to a device such as a device manufacturing number and a device ID, even though a file (X) of any authentication device 50 is leaked or illegally acquired, a file (X) of another authentication device 50 is not leaked. Accordingly, security can be improved. Note that, the specific information is not limited to the device manufacturing number and the device ID, and may be information such as a device model number (model number), the name of a manufacturer, a device catalog number, and a device manual number which can be identified. However, it is not necessary for the specific information to be identifiable information.

The authentication device 50 distributes the file (X) into two files (Xa and Xb) as a plurality of pieces of second distribution information by using an encryption key (first encryption key) (S502). With regard to file distribution stated here, the method exemplified in FIG. 2 or FIG. 3 can be employed. Even though the file (X) is leaked or illegally acquired, since an attacker does not know the encryption key and a distribution algorithm, it is possible to prevent the two files (Xa and Xb) from being analogized.

The authentication device 50 transmits one file (here, the file (Xa)) between the two files (Xa and Xb) to the authentication target device 10 and shares the file (S503). The authentication target device 10 receives the file (Xa) and retains the file in the storage unit 15 (S101). According to this, the authentication device 50 and the authentication target device 10 share the file (Xa).

Sharing of the file (Xa) can be flexibly performed at any timing. For example, in a case where the authentication device 50 and the authentication target device 10 are manufactured by the same manufacturer and association thereof is known in advance, the sharing can be performed in a manufacturing stage (before shipment). In addition, the file (Xa) may be shared at timing such as initial setting of the authentication target device 10 or at the time of initial activation.

When sharing the file (Xa) as sharing information without sharing the file (X) that is the device information 521, even though the file (Xa) is leaked or illegally acquired, two different files (Xa and Xb) can be generated again by using the file (X), each of the authentication device 50 and the authentication target device 10 can generate a different common key as described later, and it is possible to reduce an influence of leakage or illegal acquisition of sharing information.

Figure 5:
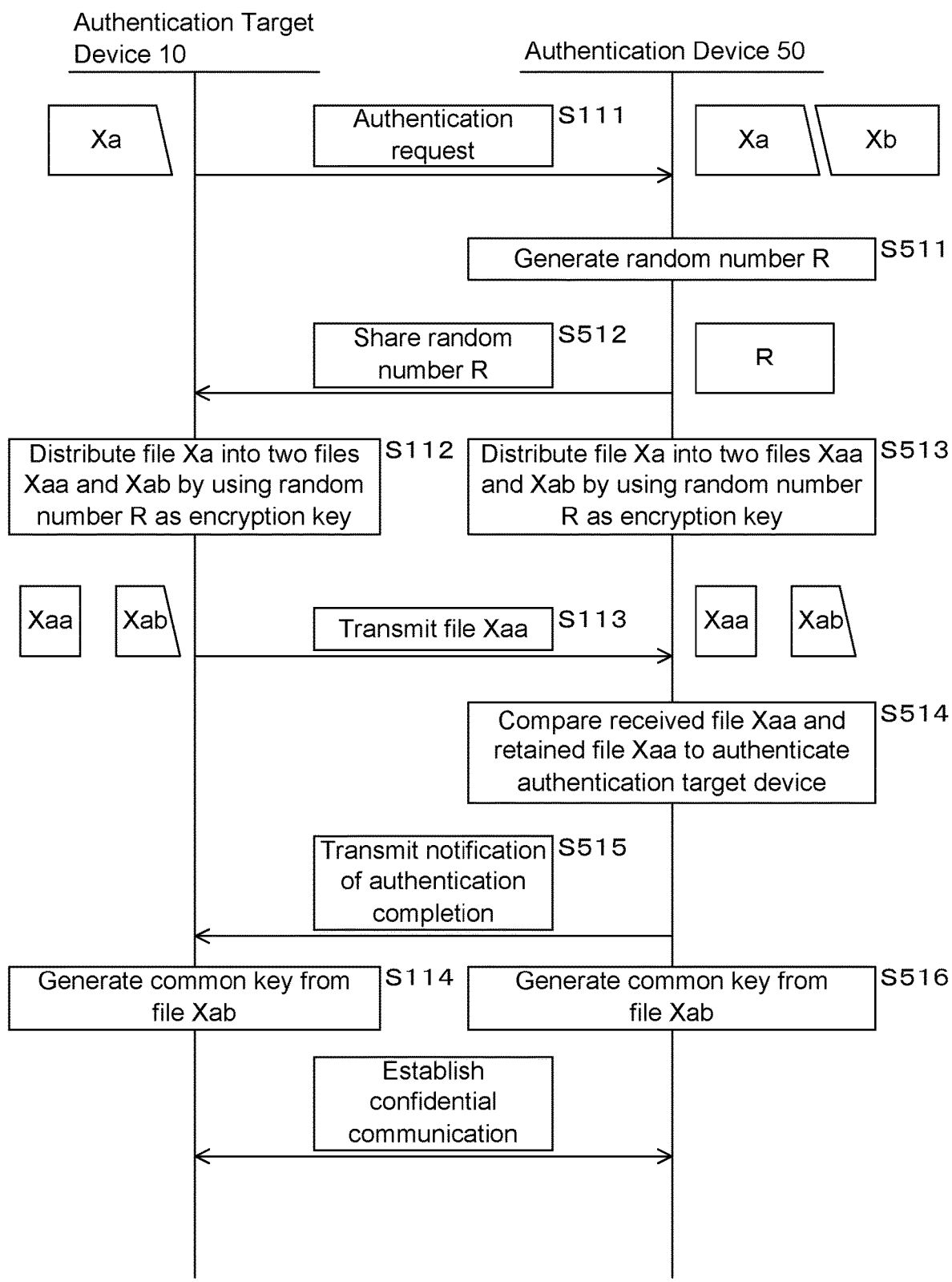
FIG. 5 is a flowchart illustrating an example of a common key sharing method.

FIG. 5 is a flowchart illustrating an example of a common key sharing method. As illustrated in FIG. 4, the authentication device 50 and the authentication target device 10 share the file (Xa) in advance. The authentication target device 10 transmits an authentication request to the authentication device 50 (S111).

The authentication device 50 generates a random number (R) (S511), and transmits the generated random number (R) to the authentication target device 10 and shares the random number (R) (S512). The authentication device 50 can retain the generated random number (R) in the storage unit 55. The authentication target device 10 can retain the received random number (R) in the storage unit 15.

The authentication device 50 distributes the file (Xa) into two files (Xaa and Xab) by using the random number (R) as an encryption key (S513). With regard to file distribution stated here, the method exemplified in FIG. 2 or FIG. 3 can be employed. The authentication device 50 can retain the generated files (Xaa and Xab) in the storage unit 55.

The authentication target device 10 also distributes the file (Xa) into two files (Xaa and Xab) by using a random number (R) as an encryption key as in the authentication device 50 (S112). With regard to file distribution stated here, the same method as in the authentication device 50 can be employed. The authentication target device 10 can retain the generated files (Xaa and Xab) in the storage unit 15.

The authentication device 50 and the authentication target device 10 use the random number (R) as the encryption key but may use a derivation value (R') derived from the random number (R) as the encryption key instead of the random number (R). Since the random number (R) is transmitted and received through the communication channel 1, the random number (R) may be leaked or illegally acquired. Even though the random number (R) is leaked or illegally acquired, it is possible to prevent leakage of the encryption key that is actually used by a predetermined encoding method as long as a key derivation algorithm is not leaked. In addition, key sharing security can be further improved in comparison to a case where the random number (R) flowing through the communication channel is used as is.

In addition, whenever the random number (R) is shared between the authentication device 50 and the authentication target device 10, in order words, whenever the authentication target device 10 transmits an authentication request, the random number (R) that is generated by the authentication device 50 may be set to a different value. According to this, different values (Xaa and Xab) can be generated by the processing in steps S112 and S513 whenever the authentication request is made. Furthermore, the authentication device 50 and the authentication target device 10 can generate the files without exchanging the files through the communication channel. In addition, different files (Xaa and Xab) may be generated by the processing in steps S112 and S513, the random number (R') may be generated by one file (for example, Xaa or Xab) between the generated files, the generated random number R' may be shared, and distribution information like Xaa and Xab may be generated by a similar processing as in steps S112 and S513.

The authentication target device 10 transmits one file (in the example in the drawing, the file (Xaa)) between the two files (Xaa and Xab) to the authentication device 50 as first distribution information for authentication (S113). Xaa to be transmitted may not be modified, but a result obtained by applying a HASH function such as SHA-2 may be transmitted to the authentication device 50 so as to further raise security or efficiency. Of course, an algorithm at this time may be any algorithm, but it is assumed that the authentication device 50 and the authentication target device 10 retain the algorithm.

The authentication device 50 compares the received file (Xaa) and the file (Xaa) retained by the authentication device 50 with each other to authenticate the authentication target device 10 (S514). Specifically, in a case where the received file (Xaa) and the file (Xaa) that is retained by the authentication device 50 match each other, the authentication device 50 determines that the authentication target device 10 is a normal device and authentication succeeds. In this case, the authentication device 50 transmits a notification of completion of authentication to the authentication target device 10 (S515). In a case where the received file (Xaa) and the file (Xaa) retained by the authentication device 50 do not match each other, the authentication device 50 sets authentication as being difficult and can stop the processing. The processing in step S515 is not essential. In addition, Xaa and Xaa may be compared with each other, and results obtained by applying a HASH function such as SHA-2 with respect to Xaa may be compared with each other.

In a case where authentication succeeds, the authentication device 50 generates a common key from the file (Xab)

(S516). The common key can be generated from the file (Xab) by using a key derivation algorithm to which the HASH function or the like is applied. Note that, the file (Xab) itself or a part of the file (Xab) may be used as the common key.

The authentication target device 10 also generates the common key from the file (Xab) as in the authentication device 50 (S114). Then, the authentication target device 10 and the authentication device 50 can establish confidential communication, and can encrypt and decrypt required data by the common key.

As described above, since each of the authentication device 50 and the authentication target device 10 generate the same file (Xab) as the first distribution information by a predetermined encoding method, it is not necessary to perform transmission and reception of the file (Xab) between the authentication device 50 and the authentication target device 10. Note that, in the example illustrated in FIG. 5, the file (Xaa) is employed for authentication, and the file (Xab) is employed for generation of an encryption key, but either the file (Xaa) or the file (Xab) may be used for authentication and generation of the common key. However, in this case, since information for generation of the common key flows through the communication channel, whether or not to use either the file (Xaa) or the file (Xab) for authentication or generation of the common key may conform to, for example, a system security policy or the like. In addition, a file for authentication and a file for generation of a sharing key may be generated by using both the files in accordance with a security policy. In addition, the number of distributions is not limited to two, and in a case of distribution into three or more, a part or the entirety may be used.

In addition, since each of the authentication device 50 and the authentication target device 10 can generate the common key, it is not necessary for the common key to be exchanged through the communication channel 1, and a risk of leakage and illegal acquisition of the common key can be reduced. In addition, since it is not necessary to use the public key infrastructure, processing becomes lighter, a processing time can be shortened, and restriction on processing capability is mitigated, and thus key sharing can be realized between wide range of devices.

In addition, since the two files (Xaa and Xab) are generated by using a predetermined encoding method, even though the file (Xaa) that is transmitted and received as information for authentication through the communication channel 1 is leaked or illegally acquired, the file (Xab) cannot be analogized from the file (Xaa). Accordingly, the common key is not generated from the file (Xab).

In addition, in the above-described example, since one file (Xaa) between the two files (Xaa and Xab) generated by using a predetermined encoding method is set as information for authentication, and the other file (Xab) is employed for generation of the common key, authentication of the authentication target device 10 and sharing of the common key are completed at a time.

The authentication device 50 can stop authentication of the authentication target device 10 by deleting the file (Xaa) for authentication which is retained by the authentication device 50. In other words, when the authentication device 50 deletes the file (Xaa) retained by the authentication device 50, a file that matches the file (Xaa) received from the authentication target device 10 does not exist, and thus the authentication device 50 sets authentication as being difficult and can stop the processing. Particularly, in a case where the authentication device 50 manages a plurality of the authentication target devices 10, processing of individually setting authentication of each of the authentication target devices 10 as being difficult requires a processing effort. In this case, in a case where a situation in which authentication of the authentication target devices 10 is stopped occurs, authentication can be simply stopped by deleting all of a plurality of pieces of information (information corresponding to Xaa) of the respective authentication target devices 10 which are retained in the authentication device 50. In addition, a certificate issuance mistake or the like is not induced.

In the example illustrated in FIG. 5, description has been given of an example in which each of the authentication device 50 and the authentication target device 10 generates two files (Xaa and Xab) from a file (Xa) by using an encryption key (for example, a random number (R)), and generates one common key, but the number of distribution files is not limited to two, and distribution into a required number of files is also possible.

In the example in FIG. 5, one file (for example, Xaa) of the two distributed files is used as data for authentication. However, there is no limitation thereto, and a value that is obtained by applying a bit string generation algorithm (for example, a hash function) with respect to any one of the two distributed files (Xaa and Xab) may be used as data for authentication.

Figure 6:
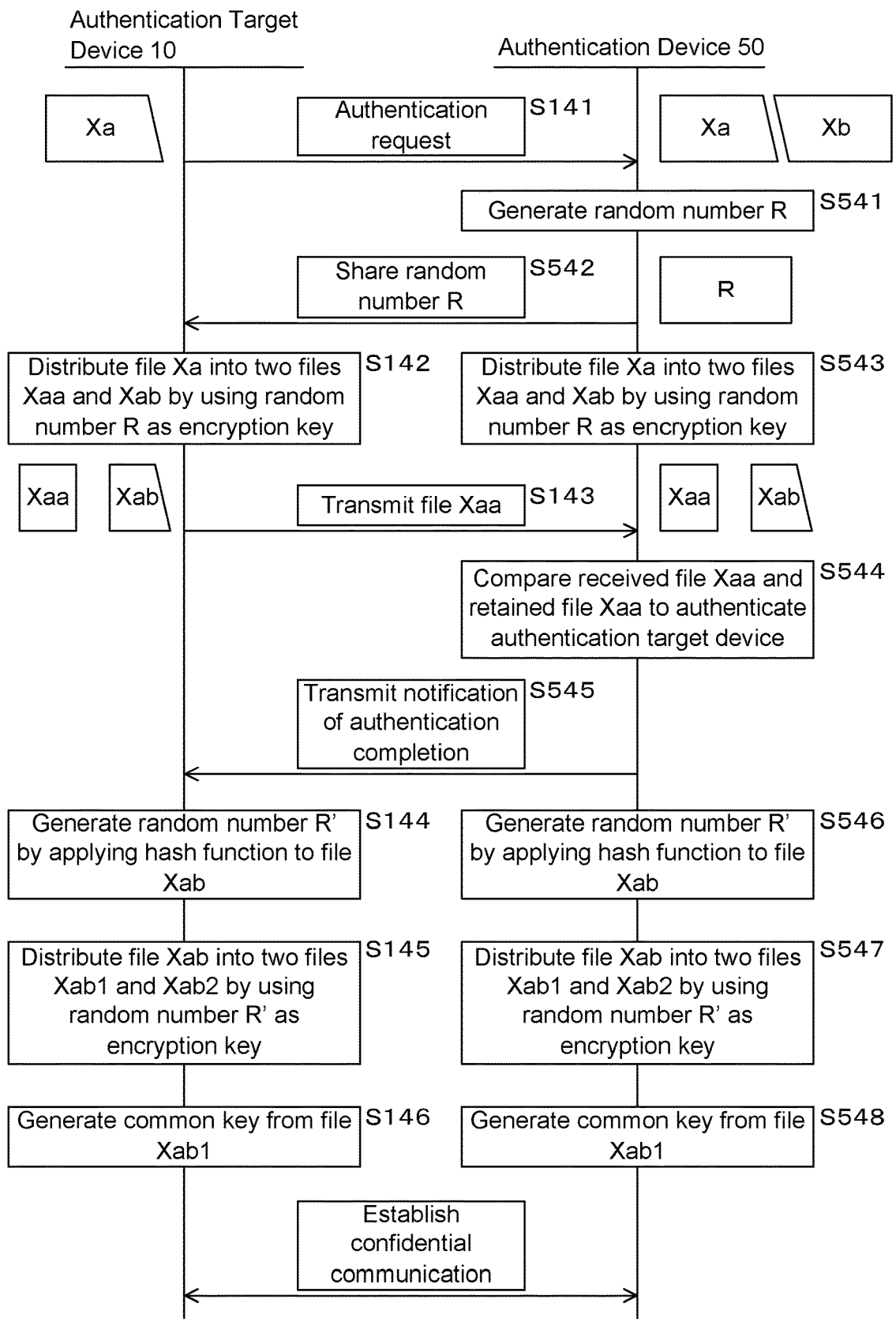
FIG. 6 is a flowchart illustrating another example of the common key sharing method.

FIG. 6 is a flowchart illustrating another example of the common key sharing method. The example illustrated in FIG. 5 has a configuration in which a random number (R) generated by the authentication device 50 is transmitted to the authentication target device 10 to share the random number (R), but there is a security concern that the random number (R) as an encryption key flows through a communication channel. In the example illustrated in FIG. 6, since a random number (R') that is common to the authentication device 50 and the authentication target device 10 is generated, the security concern can be eliminated. Hereinafter, description will be given in detail.

The authentication device 50 and the authentication target device 10 share a file (Xa) in advance. The authentication target device 10 transmits an authentication request to the authentication device 50 (S141). The authentication device 50 generates a random number (R) (S541) and transmits the generated random number (R) to the authentication target device 10 to share the random number (R) (S542). The authentication device 50 can retain the generated random number (R) in the storage unit 55. The authentication target device 10 can retain the received random number (R) in the storage unit 15.

The authentication device 50 distributes a file (Xa) into two files (Xaa and Xab) by using the random number (R) set as an encryption key (S543). With regard to file distribution stated here, the method exemplified in FIG. 2 or FIG. 3 can be employed. The authentication device 50 can retain generated files (Xaa and Xab) in the storage unit 55.

The authentication target device 10 also distributes the file (Xa) into two files (Xaa and Xab) by using a random number (R) as an encryption key as in the authentication device 50 (S142). With regard to file distribution stated here, the same method as in the authentication device 50 can be employed. The authentication target device 10 can retain the generated files (Xaa and Xab) in the storage unit 15.

The authentication target device 10 transmits one file (in the example in the drawing, the file (Xaa)) between the two files (Xaa and Xab) to the authentication device 50 as first distribution information for authentication (S143). The authentication device 50 compares the received file (Xaa) and a file (Xaa) that is retained by the authentication device 50 with each other to authenticate the authentication target device 10 (S544). Specifically, in a case where the received file (Xaa) and the file (Xaa) that are retained by the authentication device 50 match each other, the authentication device 50 determines that the authentication target device 10 is a normal device and authentication succeeds. In this case, the authentication device 50 transmits a notification of completion of authentication to the authentication target device 10 (S545). In a case where the received file (Xaa) and the file (Xaa) retained by the authentication device 50 do not match each other, the authentication device 50 sets authentication as being difficult and can stop the processing.

The authentication target device 10 generates a random number (R') by applying a hash function to one file (in the example in the drawing, the file (Xaa)) between the two files (Xaa and Xab) (S144). The authentication device 50 also generates the random number (R') by applying a hash function to the file (Xaa) (S546). Whether to apply the hash function to which file between the two files (Xaa and Xab) may be determined in advance between the authentication target device 10 and the authentication device 50.

The authentication device 50 distributes the file (Xab) into two files (Xab1 and Xab2) by using the random number (R') as an encryption key (S547). With regard to file distribution stated here, the method exemplified in FIG. 2 or FIG. 3 can be employed.

The authentication target device 10 distributes the file (Xab) into two files (Xab1 and Xab2) by using the random number (R') as an encryption key as in the authentication device 50 (S145). With regard to file distribution stated here, the same method as in the authentication device 50 can be used.

The authentication device 50 generates a common key from the file (Xab1) (S548). The common key can be generated from the file (Xab1) by using a key derivation algorithm to which the HASH function or the like is applied. Note that, the file (Xab1) itself or a part of the file (Xab1) may be used as the common key. Note that, the common key may also be generated from the file (Xab2).

The authentication target device 10 also generates the common key from the file (Xab1) as in the authentication device 50 (S146). Then, the authentication target device 10 and the authentication device 50 can establish confidential communication, and can encrypt and decrypt required data by the common key.

Figure 7:
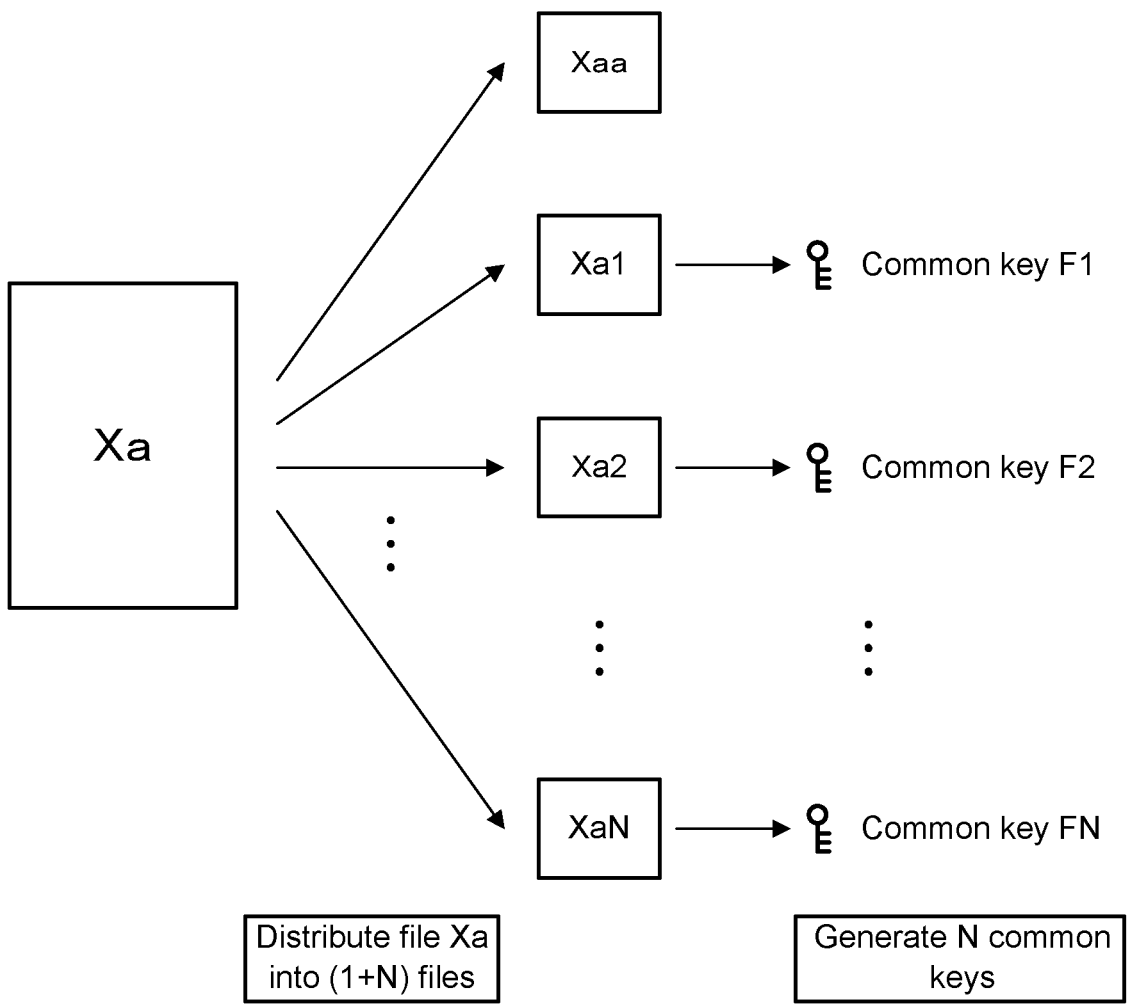
FIG. 7 is a schematic view illustrating an example of simultaneously generating a plurality of common keys.

FIG. 7 is a schematic view illustrating an example of simultaneously generating a plurality of common keys. As illustrated in FIG. 7, each of the authentication device 50 and the authentication target device 10 can generate (1+N) distribution files from the file (Xa). In the example illustrated in FIG. 7, files (Xaa, Xa1, Xa2, . . . , and XaN) are distributed. As in a case of FIG. 5, the file (Xaa) can be used as information for authentication. Common keys F1, F2, . . . , and FN can be generated from the N files (Xa1, Xa2, . . . , and XaN) by performing a similar processing as in the case of FIG. 5.

In the $5^{th}$ generation mobile communication system (5G), communication can be performed by simultaneously opening a plurality of channels differently from mobile communication in the related art. According to this, one device can simultaneously communicate with a plurality of devices, or communication can be performed by simultaneously opening a plurality of channels between devices in a one-to-one relationship without performing communication by one channel. In the mobile communication in the $5^{th}$ generation mobile communication system, when applying this embodiment, since a plurality of common keys can be simultaneously used without actually performing key exchange through a network, the amount of communication until performing key sharing can be reduced with efficiency. In addition, according to this, hacker attack resistance can be improved.

Furthermore, in the $5^{th}$ generation mobile communication system (5G), for example, a selection method of a common key with each device in a case where one device simultaneously performs communication with a plurality of devices is as follows. A value obtained by hashing the file (Xaa) is encrypted by using common keys obtained from files (Xa1, Xa2, . . . , and XaN). N encryption results obtained are transferred to a device one by one through each communication channel. On each device side, whether to use which common key is determined by comparing respective values obtained by encrypting a value obtained by hashing the file (Xaa) with common keys obtained from the N files (Xa1, Xa2, . . . , and XaN) and values obtained from communication channels with each other.

Figure 8:
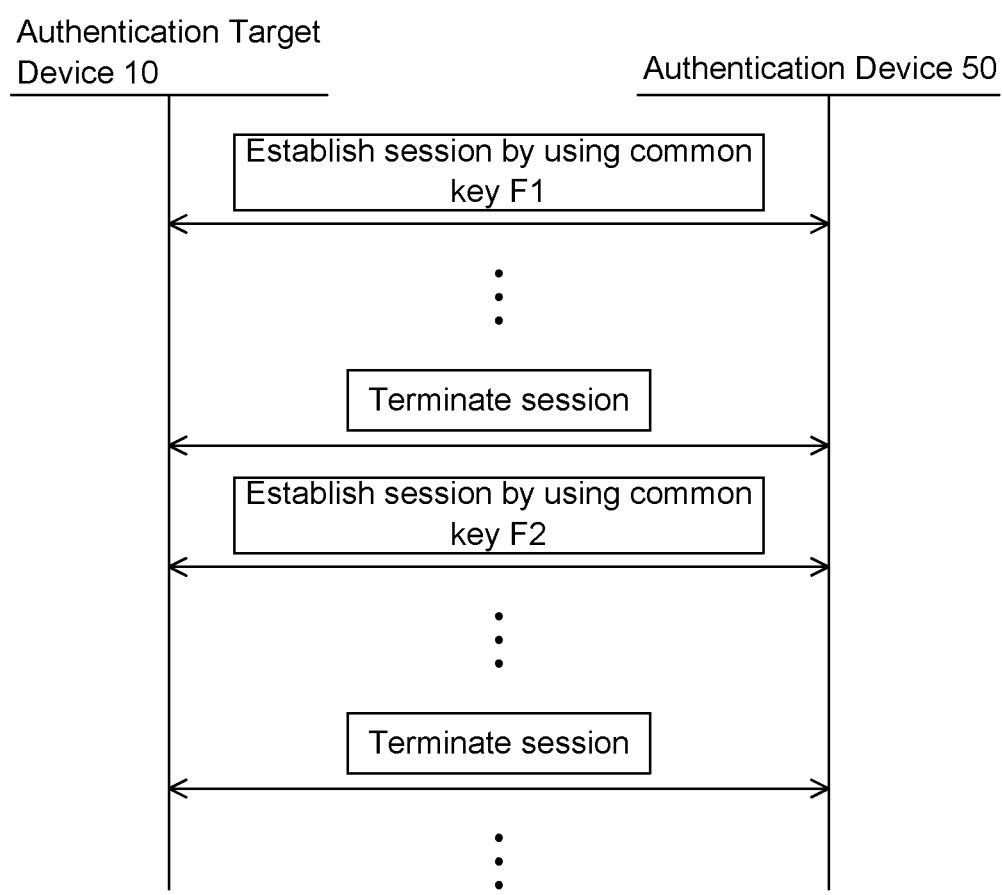
FIG. 8 is a schematic view illustrating an example of confidential communication between an authentication device and an authentication target device.

FIG. 8 is a schematic view illustrating an example of confidential communication between the authentication device 50 and the authentication target device 10. As illustrated in FIG. 8, each of the authentication device 50 and the authentication target device 10 establishes a session (establishes a confidential communication channel) by using a generated common key F1, performs transmission and reception of required information, and terminates the session. Next, each of the authentication device 50 and the authentication target device 10 establishes a session (establishes a confidential communication channel) by using a generated common key F1, performs transmission and reception of required information, and terminates the session. Hereinafter, the same processing can be performed. For example, in a case of generating two common keys F1 and F2, the common key F1 and F2 can be alternately employed for every session. In addition, in a case where three or more common keys are generated, the order of usage of the common keys may be determined in advance between the authentication device 50 and the authentication target device 10. In comparison to a case where one common key is continuously used, a security level of communication between the authentication device 50 and the authentication target device 10 can be further improved.

In the example illustrated in FIG. 5, in a case where the authentication device 50 authenticates the authentication target device 10, the file (Xaa) is used as information for authentication. In other words, when authenticating the authentication target device 10, the file (Xaa) flows through the communication channel 1. In a case where the file (Xaa) is leaked or illegally acquired, there is a possibility that impersonation of the authentication target device 10 may be performed. Particularly, in a case where establishment and termination of the session are repeated between the authentication device 50 and the authentication target device 10, the same file (Xaa) flows through the communication channel 1 for every session, and there is a possibility that the file (Xaa) may be leaked or illegally acquired. Hereinafter, a method for coping with such a case will be described.

Figure 9:
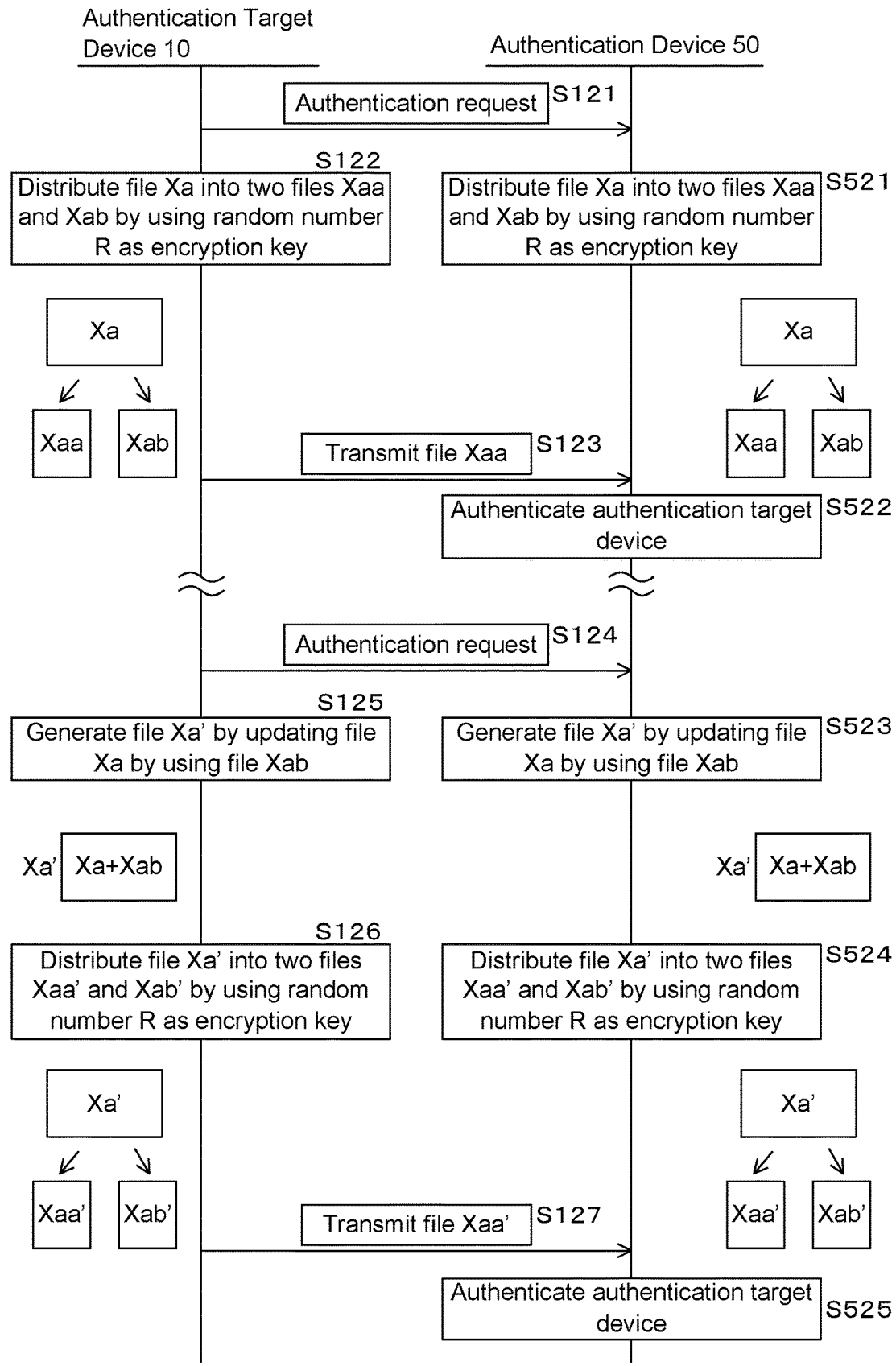
FIG. 9 is a flowchart illustrating an example of an updating method of information for authentication.

FIG. 9 is a flowchart illustrating an example of an updating method of information for authentication. The authentication device 50 and the authentication target device 10 retain a file (Xa) in advance. The authentication target device 10 transmits an authentication request to the authentication device 50 (S121).

In addition, as in the case described with reference to FIG. 5, it is assumed that the authentication device 50 and the authentication target device 10 share a random number (R).

The authentication device 50 distributes the file (Xa) into two files (Xaa and Xab) by using the random number (R) as an encryption key (S521). With regard to file distribution stated here, the method exemplified in FIG. 2 or FIG. 3 can be employed. The authentication device 50 can retain the generated files (Xaa and Xab) in the storage unit 55.

The authentication target device 10 also distributes the file (Xa) into two files (Xaa and Xab) by using the random number (R) as an encryption key as in the authentication device 50 (S122). With regard to file distribution stated here, the same method as in the authentication device 50 can be employed. The authentication target device 10 can retain the generated files (Xaa and Xab) in the storage unit 15.

The authentication target device 10 transmits one file (in the example in the drawing, the file (Xaa)) between the two files (Xaa and Xab) to the authentication device 50 as first distribution information for authentication (S123).

The authentication device 50 compares the received file (Xaa) and a file (Xaa) that is retained by the authentication device 50 with each other to authenticate the authentication target device 10 (S522). The subsequent processing in each of the authentication device 50 and the authentication target device 10 is similar as in the case in FIG. 5, and thus description will be omitted.

It is assumed that a previous session has been terminated and an event requiring authentication of the authentication target device 10 has occurred (for example, the start of the next session, activation of the authentication target device 10, and the like). The authentication target device 10 transmits an authentication request to the authentication device 50 (S124). The authentication device 50 may transmit an authentication request to the authentication target device 10 for further improvement of security.

The authentication device 50 generates a file (Xa') by updating the file (Xa) by using the file (Xab) (S523). Generation of the file (Xa') can be performed as follows. In other words, when the file (Xa) is set as a binary string, a binary string obtained by adding a hash value of the file (Xab) to the end of the binary string can be set as the file (Xa'). When the file (Xa) is updated to the file (Xa'), a file that is distributed and generated from the file (Xa') can be made different from files (Xaa and Xab) distributed and generated from the file (Xa), and information for authentication which is different from information for authentication (for example, the file (Xaa)) can be generated. In addition, in a case where a plurality of hash functions are prepared, and a different hash function is used when acquiring a hash value of the file (Xab), the generated file (Xa') can be made different for every generation. Note that, when the file (Xa) is updated for the first time, since the file (Xab) is not retained, an initial value may be prepared and the initial value may be used.

The authentication target device 10 also generates the file (Xa') by updating the file (Xa) by using the file (Xab) as in the authentication device 50 (S125).

The authentication device 50 distributes the file (Xa') into two files (Xaa' and Xab') by using the random number (R) as an encryption key (S524). With regard to file distribution stated here, the method exemplified in FIG. 2 or FIG. 3 can be employed. The authentication device 50 can retain the generated files (Xaa' and Xab') in the storage unit 55.

The authentication target device 10 also distributes the file (Xa') into two files (Xaa' and Xab') by using the random number (R) as an encryption key (S126). With regard to file distribution stated here, the same method as in the authentication device 50 can be used. The authentication target device 10 can retain the generated files (Xaa' and Xab') in the storage unit 15.

The authentication target device 10 transmits one file (in the example illustrated in the drawing, the file (Xaa')) between the two files (Xaa' and Xab') to the authentication device 50 as first distribution information for authentication (S127).

The authentication device 50 compares the received file (Xaa') and the file (Xaa') retained by the authentication device 50 with each other to authenticate the authentication target device 10 (S525). The subsequent processing of each of the authentication device 50 and the authentication target device 10 is similar as in the case of FIG. 5, and thus description will be omitted.

As described above, the information for authentication which flows through the communication channel 1 is modified from the file (Xaa) to the file (Xaa'), and becomes different data. According to this, for example, when a session is changed, the information for authentication is also changed, and thus the same information for authentication is prevented from repeatedly flowing through the communication channel 1, and a possibility of leakage or illegal acquisition can be lowered.

In the example in FIG. 4 and FIG. 5, the file (Xa) is shared as sharing information between the authentication device 50 and the authentication target device 10. Since the file (Xa) flows through the communication channel 1, the possibility of leakage or illegal acquisition cannot be denied. In addition, if an attacker was able to generate the file (Xab) distributed from the file (Xa) by using any method, theoretically, the common key may be exposed. In this case, when the attacker was able to illegally acquire information retained for a long period of time between the authentication device 50 and the authentication target device 10, a situation in which the content of the information retained for a long period of time is decrypted at a later data may occur. Hereinafter, description will be given of a method of preventing information transmitted and received over a long period of time from being leaked at a later date even though the sharing information is leaked or illegally acquired.

Figure 10:
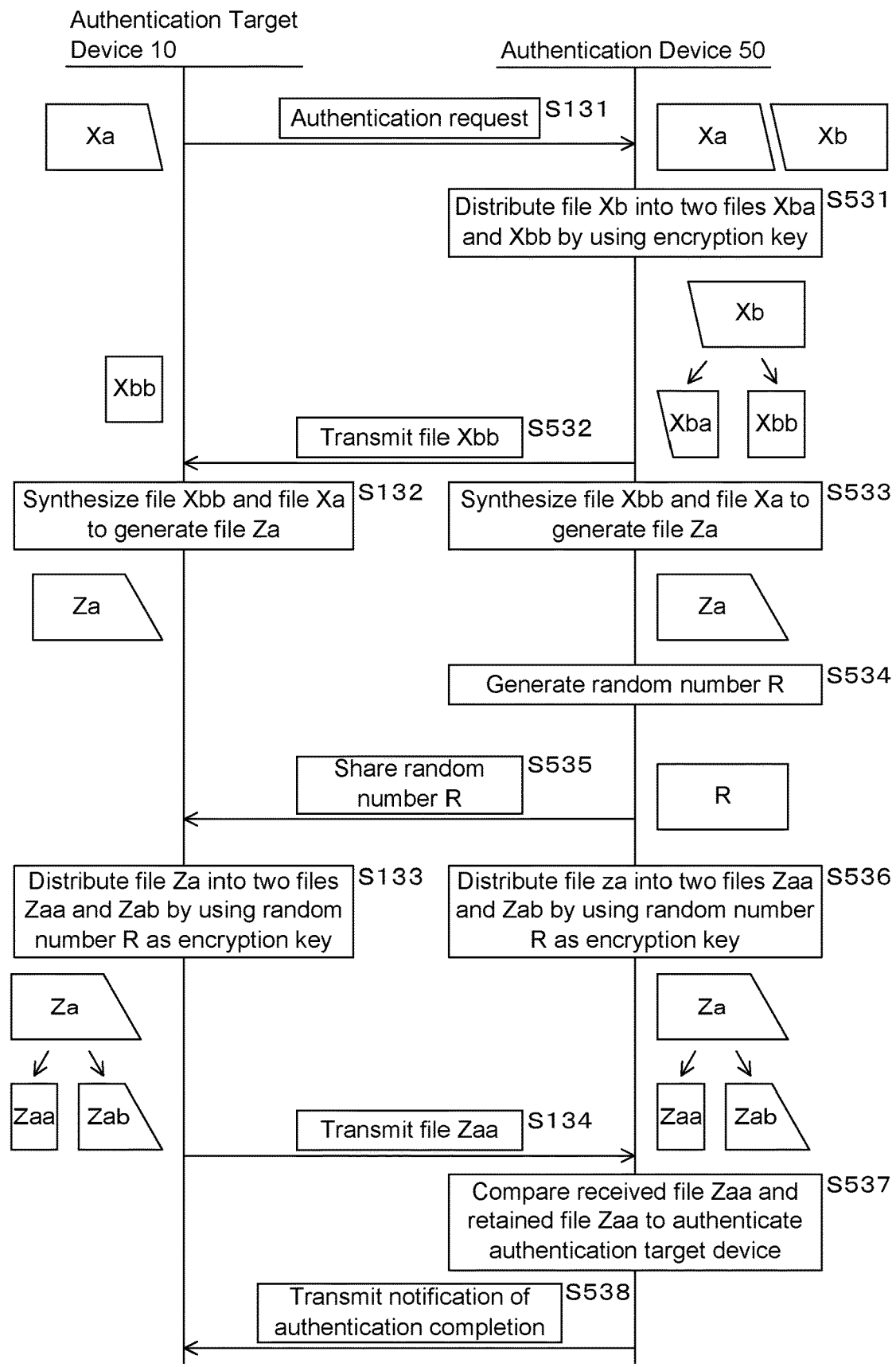
FIG. 10 is a flowchart illustrating an example of a method of coping with leakage or illegal acquisition of sharing information.

FIG. 10 is a flowchart illustrating an example of a method of coping with leakage or illegal acquisition of the sharing information. As described with reference to FIG. 4, the authentication device 50 retains the files (Xa and Xb), and the authentication target device 10 shares the file (Xa) as sharing information with the authentication device 50. It is assumed that the file (Xa) is sharing information to be leaked or illegally acquired at a later date.

The authentication target device 10 transmits an authentication request to the authentication device 50 (S131).

The authentication device 50 distributes a file (Xb) by using an encryption key (second encryption key) to generate two files (Xba and Xbb) as third distribution information (S531). As the file before distribution, a file (Xb) different from the file (Xa) that is sharing information is used. The reason for this is because a possibility that the file (Xb) is leaked or illegally acquired is extremely low. Here, a possibility that a distribution method or an encryption key is leaked or illegally acquired is also low. The encryption key (second encryption key) may be the same key as the encryption key (first encryption key) illustrated in FIG. 4, or a different key may be used.

The authentication device 50 transmits one file (in the example in the drawing, the file (Xbb)) to the authentication target device 10 (S532).

The authentication device 50 synthesizes the file (Xbb) and the file (Xa) to generate a file (Za) (S533). With regard to a file synthesis method, the file (Xbb) and the file (Xa) may be simply connected, or each of the file (Xbb) and the file (Xa) is divided into a plurality of binary strings, and the divided binary strings may be arranged alternately to form one file. As the synthesis method, an appropriate method may be used, but when the synthesis method is made more complicated, security strength can be raised.

The authentication target device 10 also synthesizes the file (Xbb) and the file (Xa) by using a similar synthesis method as in the authentication device 50 to generate a file (Za) (S132). According to this, the authentication device 50 and the authentication target device 10 can share the file (Za) as sharing information. In addition, since the file (Za) does not flow through the communication channel 1, a possibility of leakage or illegal acquisition is extremely low. In addition, when generating the file (Za) so that a different file is generated for every authentication request, security can be further improved.

The authentication device 50 generates a random number (R) (S534), and transmits the generated random number (R) to the authentication target device 10 and shares the random number (R) (S535). The authentication device 50 can retain the generated random number (R) in the storage unit 55. The authentication target device 10 can retain the received random number (R) in the storage unit 15.

The authentication device 50 distributes the file (Za) into two files (Zaa and Zab) by using the random number (R) as an encryption key (S536). With regard to file distribution stated here, the method exemplified in FIG. 2 or FIG. 3 can be employed. The authentication device 50 can retain the generated files (Zaa and Zab) in the storage unit 55.

The authentication target device 10 also distributes the file (Za) into two files (Zaa and Zab) by using the random number (R) as an encryption key as in the authentication device 50 (S133). With regard to file distribution stated here, the same method as in the authentication device 50 can be used. The authentication target device 10 can retain the generated files (Zaa and Zab) in the storage unit 15.

Whenever the random number (R) is shared between the authentication device 50 and the authentication target device 10, in other words, whenever the authentication target device 10 transmits an authentication request, the random number (R) generated by the authentication device 50 may be set to a different value. According to this, different files (Zaa and Zab) can be generated for every authentication request.

The authentication target device 10 transmits one file (in the example in the drawing, the file (Zaa)) between the two files (Zaa and Zab) to the authentication device 50 as first distribution information for authentication (S134).

The authentication device 50 compares the received file (Zaa) and the file (Zaa) retained by the authentication device 50 with each other to authenticate the authentication target device 10 (S537). In a case where it is determined that authentication succeeds, the authentication device 50 transmits a notification of completion of authentication to the authentication target device 10 (S538).

The subsequent processing is similar as in the case of FIG. 5, and in a case where authentication succeeds, the authentication device 50 generates a common key from the file (Zab). The authentication target device 10 also generates the common key from the file (Zab) as in the authentication device 50. Then, the authentication target device 10 and the authentication device 50 can establish confidential communication, and can encrypt and decrypt required data by the common key.

As described above, even though the file (Xa) as sharing information is leaked or illegally acquired, and an encryption key derived from the file (Xa) is exposed, since a different common key that is derived from the file (Za) as the sharing information is used for every session, information that can be decrypted is limited, and it is possible to prevent a situation in which the content of information retained over a long period of time is decrypted at a later date.

Figure 11:
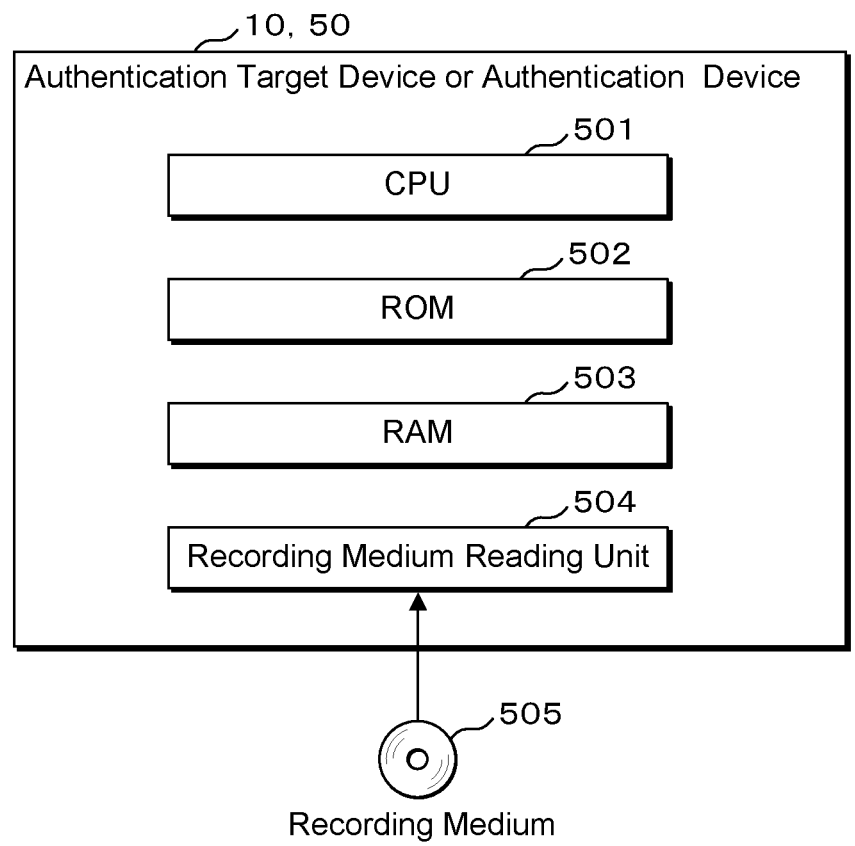
FIG. 11 is a schematic view illustrating other example of a configuration of an authentication target device and an authentication device.

As illustrated in FIG. 11, the authentication target device 10 and the authentication device 50 can also be realized by using a computer provided with a CPU (processor) 501, a ROM 502, a RAM 503, recording medium reading unit 504, and the like. A computer program, recorded on a recording medium 505, that defines the procedures of the processes of the authentication target device 10 and the authentication device 50 is read out by a recording medium reading unit provided in the computer, and the read-out computer program is loaded on the RAM 503, and the computer program is executed by the CPU (processor) 501. According to this, the authentication target device 10 and the authentication device 50 can be realized on the computer.

According to this embodiment, actually, the common key is not shared (key exchanged) through a communication channel, but the same effect as in key exchange can be actually obtained. In addition, information that becomes the basis of generation of the common key cannot be analogized from information (for example, information for authentication) that flows through the communication channel. The reason for this is because a predetermined encoding method such as a secret distribution method is used. In addition, since the common key is shared, the amount of information that is transmitted and received through a communication channel is smaller in comparison to the related art, the amount of communication can be reduced, and resistance to attack from an attacker can be raised. In addition, another characteristic of this embodiment is that the public key infrastructure in which the management cost is high as in the related art may not be used. According to this embodiment, processing can be lighter, processing time can be shortened, and restriction on processing capability is also mitigated, and thus key sharing can be realized between wide range of devices. Particularly, applications can also be made to devices with relatively low CPU power as in an IoT device without limitations.

A key sharing method of this embodiment is a key sharing method between an authentication device and an authentication target device. The authentication device shares sharing information with the authentication target device in advance, one of the authentication device and the authentication target device shares a generation value generated by a predetermined method with the other of the authentication device and the authentication target device, and each of the authentication device and the authentication target device generates a plurality of pieces of first distribution information from the sharing information by using the generation value with a predetermined encoding method capable of restoring data before distribution by arranging all or a part of a plurality of pieces of distribution data obtained by distributing the data before distribution, and shares one piece of first distribution information among the plurality of pieces of first distribution information or derivation information derived from the one piece of first distribution information as a common key.

A key sharing system of this embodiment is a key sharing system including the authentication device and the authentication target device. The authentication device shares sharing information with the authentication target device in advance, one of the authentication device and the authentication target device shares a generation value generated by a predetermined method with the other of the authentication device and the authentication target device, and each of the authentication device and the authentication target device includes a distribution information generation unit that generates a plurality of pieces of first distribution information from the sharing information by using the generation value with a predetermined encoding method capable of restoring data before distribution by arranging all or a part of a plurality of pieces of distribution data obtained by distributing the data before distribution, and a common key generation unit that generates one piece of first distribution information among the plurality of pieces of first distribution information or derivation information derived from the one piece of first distribution information as a common key between the authentication device and the authentication target device.

The authentication device of this embodiment shares sharing information and a generation value generated by a predetermined method with an authentication target device. The authentication device includes a distribution information generation unit that generates a plurality of pieces of first distribution information from the sharing information by using the generation value with a predetermined encoding method capable of restoring data before distribution by arranging all or a part of a plurality of pieces of distribution data obtained by distributing the data before distribution, and a common key generation unit that generates one piece of first distribution information among the plurality of pieces of first distribution information or derivation information derived from the one piece of first distribution information as a common key with the authentication target device.

The authentication target device of this embodiment shares sharing information and a generation value generated by a predetermined method with an authentication device. The authentication target device includes a distribution information generation unit that generates a plurality of pieces of first distribution information from the sharing information by using the generation value with a predetermined encoding method capable of restoring data before distribution by arranging all or a part of a plurality of pieces of distribution data obtained by distributing the data before distribution, and a common key generation unit that generates one piece of first distribution information among the plurality of pieces of first distribution information or derivation information derived from the one piece of first distribution information as a common key with the authentication device.

The computer program of this embodiment causes a computer to execute processing of sharing information and a generation value generated by a predetermined method with an authentication target device, processing of generating a plurality of pieces of first distribution information from the sharing information by using the generation value with a predetermined encoding method capable of restoring data before distribution by arranging all or a part of a plurality of pieces of distribution data obtained by distributing the data before distribution, and processing of generating one piece of first distribution information among the plurality of pieces of first distribution information or derivation information derived from the one piece of first distribution information as a common key with the authentication target device.

The computer program of this embodiment causes a computer to execute processing of sharing information and a generation value generated by a predetermined method with an authentication device, processing of generating a plurality of pieces of first distribution information from the sharing information by using the generation value with a predetermined encoding method capable of restoring data before distribution by arranging all or a part of a plurality of pieces of distribution data obtained by distributing the data before distribution, and processing of generating one piece of first distribution information among the plurality of pieces of first distribution information or derivation information derived from the one piece of first distribution information as a common key with the authentication device.

The authentication device shares the sharing information with the authentication target device in advance. The authentication device is a device that authenticates the authentication target device, and the authentication target device is a device to be authenticated. The sharing information may be any information, but information specific to the authentication device is preferable. As a sharing method of the sharing information, for example, an appropriate method can be used in correspondence with a security level of the authentication device and the authentication target device.

One side of the authentication device and the authentication target device shares the generation value generated by any one side with a predetermined method with the other side. For example, when the authentication device generates a generation value, the authentication device can transmit the generation value to the authentication target device. With regard to the generation value, for example, it is preferable that a different generation value is generated for each generation, and for example, a random number generated by a random number generation unit may be set as the generation value.

Each of the authentication device and the authentication target device generates a plurality of pieces of first distribution information from the sharing information by using the generation value with a predetermined encoding method. The predetermined encoding method is a method that can restore data before distribution by arranging all or a part of a plurality of pieces of distribution data obtained by distributing the data before distribution, and the same encoding method is employed in the authentication device and the authentication target device. According to this, each of the authentication device and the authentication target device can generate first distribution information that is common thereto. The generation value can be used as an encryption key. The encryption key can be used as the same key in encryption and decryption. Since the authentication device and the authentication target device generate the same first distribution information by the predetermined encoding method, it is not necessary to perform transmission and reception of the first distribution information between the authentication device and the authentication target device.

Each of the authentication device and the authentication target device share one piece of first distribution information among a plurality of pieces of first distribution information or derivation information derived from the one piece of first distribution information as a common key. Since each of the authentication device and the authentication target device can generate the common key, it is not necessary for the common key to be exchanged through a communication channel, and a risk of leakage and illegal acquisition of the common key can be reduced. In addition, since it is not necessary to use the public key infrastructure, processing becomes lighter, a processing time can be shortened, and restriction on processing capability is mitigated, and thus key sharing can be realized between wide range of devices.

In the key sharing method of this embodiment, each of the authentication device and the authentication target device encrypts the sharing information by using the generation value as an encryption key, and divides the encrypted sharing information by a predetermined division method to generate the plurality of pieces of first distribution information.

Each of the authentication device and the authentication target device encrypts the sharing information by using the generation value as an encryption key, and divides the encrypted sharing information by a predetermined division method to generate the plurality of pieces of first distribution information. The encryption key can be used in encryption and decryption as the same key (common key encryption method). The predetermined division method determines that the encrypted sharing information will be divided with which classification.

Each of the plurality of pieces of first distribution information becomes a meaningless binary string. Even though one piece of first distribution information among the plurality of pieces of first distribution information is leaked or illegally acquired, the leaked or illegally acquired first distribution information becomes meaningless data, and another first distribution information cannot be analogized from the leaked or illegally acquired first distribution information. According to this, key sharing security can be improved.

In the key sharing method of this embodiment, each of the authentication device and the authentication target device distributes the sharing information by a secret distribution method by using the generation value as an encryption key to generate the plurality of pieces of first distribution information.

Each of the authentication device and the authentication target device distributes sharing information by a secret distribution method by using a generation value as an encryption key to generate a plurality of pieces of first distribution information. The encryption key can be used in encryption and decryption as the same key (common key encryption method). In the secret distribution method, for example, the sharing information is distributed into a plurality of pieces of first distribution information while being encrypted with the encryption key. Since the encryption key is also distributed while being embedded in the plurality of first distribution information, key management is not necessary. Whenever the secret distribution is performed, the number of distribution or a distribution ratio may be appropriately changed.

Each of the plurality of pieces of first distribution information becomes a meaningless binary string. Even though one piece of first distribution information among the plurality of pieces of first distribution information is leaked or illegally acquired, the leaked or illegally acquired first distribution information becomes meaningless data, and another first distribution information cannot be analogized from the leaked or illegally acquired first distribution information. According to this, key sharing security can be improved.

In the key sharing method of this embodiment, each of the authentication device and the authentication target device uses a derivation value that is derived from the generation value by a predetermined derivation method instead of the generation value.

Each of the authentication device and the authentication target device can use a derivation value that is derived from the generation value by a predetermined derivation method instead of the generation value. As the derivation method, an appropriate method can be used. For example, a hash value may be generated from the generation value, predetermined information may be applied to the generation value, or a hash value may be generated from the generation value to which predetermined information is added. According to this, when sharing the generation value between the authentication device and the authentication target device, even though the generation value is leaked or illegally acquired, leakage of a key value that is actually used in a predetermined encoding method can be prevented, and key sharing security can be improved.

In the key sharing method of this embodiment, the authentication device stores device information including a specific information specific to a device, encrypts the device information with a first encryption key, and divides the encrypted device information by a predetermined division method to generate a plurality of pieces of second distribution information, and shares one piece of second distribution information among the plurality of pieces of second distribution information with the authentication target device as the sharing information.

The authentication device stores device information including a specific information specific to a device. The specific information may be information specific to the authentication device, and may be, for example, be a device manufacturing number. When the device information is set as information specific to the authentication device, even though the device information of the authentication device is leaked or illegally acquired, it is possible to prevent device information of another authentication device from being leaked.

The authentication device encrypts the device information with a first encryption key, and divides the encrypted device information by a predetermined division method to generate a plurality of pieces of second distribution information. The authentication device shares one piece of second distribution information among the plurality of pieces of second distribution information which are generated with the authentication target device as the sharing information.

When the device information is not shared as the sharing information and one piece of the second distribution information is shared as the sharing information, even though one piece of the second distribution information is leaked or illegally acquired, since the authentication device and the authentication target device can generate another common key again by generating another second distribution information by using the device information, an influence of leakage or illegal acquisition can be reduced.

In the key sharing method of this embodiment, the authentication device stores device information including specific information specific to a device, distributes the device information by using a first encryption key by a secret distribution method to generate a plurality of pieces of second distribution information, and shares one piece of second distribution information among the plurality of pieces of second distribution information with the authentication target device as the sharing information.

The authentication device stores device information including specific information specific to a device. The specific information may be information specific to the authentication device, and may be, for example, a device manufacturing number. When the device information is set as information specific to the authentication device, even though the device information of the authentication device is leaked or illegally acquired, it is possible to prevent device information of another authentication device from being leaked.

The authentication device distributes the device information by using a first encryption key by a secret distribution method to generate a plurality of pieces of second distribution information. The authentication device shares one piece of second distribution information among the plurality of pieces of second distribution information which are generated with the authentication target device as the sharing information.

When the device information is not shared as the sharing information and one piece of the second distribution information is shared as the sharing information, even though one piece of the second distribution information is leaked or illegally acquired, since the authentication device and the authentication target device can generate another common key again by generating another second distribution information by using the device information, an influence of leakage or illegal acquisition can be reduced.

In the key sharing method of this embodiment, the authentication device generates a plurality of pieces of third distribution information from another second distribution information among the plurality of pieces of second distribution information by using the predetermined encoding method and a second encryption key, and shares one piece of third distribution information among the plurality of pieces of third distribution information with the authentication target device. Each of the authentication device and the authentication target device generates a synthesis value obtained by synthesizing one piece of the third distribution information and one piece of the second distribution information, and generates the plurality of pieces of first distribution information from the synthesis value by using the generation value by the predetermined encoding method.

The authentication device generates a plurality of pieces of third distribution information from another second distribution information among the plurality of pieces of second distribution information by using a second encryption key with the predetermined encoding method. The other second distribution information is second distribution information different from one piece of the second distribution information shared by the authentication device and the authentication target device as the sharing information. Generation of the plurality of pieces of third distribution information can be performed, for example, for every session between the authentication device and the authentication target device. The authentication device shares one piece of third distribution information among the plurality of pieces of third distribution information with the authentication target device. According to this, the authentication device and the authentication target device can share different third distribution information for every session.

Each of the authentication device and the authentication target device generates a synthesis value obtained by synthesizing one piece of the third distribution information and one piece of the second distribution information. The synthesis value may be synthesized by simply joining the one piece of second distribution information to the one piece of third distribution information, or may be synthesized by alternately exchanging a predetermined number of binary strings. Each of the authentication device and the authentication target device generates the plurality of pieces of first distribution information from the synthesis value by using the generation value with the predetermined encoding method.

Each of the authentication device and the authentication target device can share one piece of first distribution information among the plurality of pieces of first distribution information or derivation information derived from the one piece of first distribution information as a common key. According to this, since each of the authentication device and the authentication target device can generate and share a different common key, for example, for every session, even though one piece of the second distribution information shared as the sharing information is leaked or illegally acquired, and the common key is decrypted, since the common key is different for every session, decrypted data is limited to only a session in which the one piece of second distribution information is leaked or illegally acquired even when data flowing through a network between the authentication device and the authentication target device is illegally acquired over a long period of time. Accordingly, it is possible to prevent all pieces of illegally acquired data from being decrypted.

In the key sharing method of this embodiment, the authentication device can acquire the device information from an external server.

The authentication device can acquire the device information from an external server. For example, when a plurality of the authentication devices are collectively managed by the external server, and the device information is updated as necessary, the authentication devices can acquire the latest device information. According to this, insecurity of the device information can be prevented.

In the key sharing method of this embodiment, each of the authentication device and the authentication target device shares each of parts of the plurality of pieces of first distribution information or each of a plurality of pieces of derivation information derived from the parts of the plurality of pieces of first distribution information as a plurality of different common keys.

Each of the authentication device and the authentication target device shares each of parts of the plurality of pieces of first distribution information or each of a plurality of pieces of derivation information derived from the parts of the plurality of pieces of first distribution information as a plurality of different common keys. In a mobile communication standard 5G, even in a case where communication is performed by simultaneously opening a plurality of channels, confidential communication can be realized by allocating a different common key to each of the plurality of channels.

In the key sharing method of this embodiment, the authentication target device transmits first distribution information for authentication among the plurality of pieces of first distribution information to the authentication device, and the authentication device authenticates the authentication target device by using the first distribution information for authentication which is transmitted from the authentication target device and the first distribution information for authentication which is retained by the authentication device.

The authentication target device transmits first distribution information for authentication among the plurality of pieces of first distribution information to the authentication device. The authentication device authenticates the authentication target device by using the first distribution information for authentication which is transmitted from the authentication target device and the first distribution information for authentication which is retained by the authentication device. For example, in a case where the first distribution information transmitted from the authentication target device and the first distribution information for authentication which is retained by the authentication device match each other, the authentication device authenticates the authentication target device as a normal device. Since one piece of first distribution information among the plurality of pieces of first distribution information is used as the information for authentication, authentication of the authentication target device and sharing of the common key are completed at a time.

In the key sharing method of this embodiment, each of the authentication device and the authentication target device updates the sharing information by using one piece of the first distribution information among the plurality of pieces of first distribution information generated from the sharing information, and generates a plurality of pieces of first distribution information different from the plurality of pieces of first distribution information on the basis of the updated sharing information.

Each of the authentication device and the authentication target device updates the sharing information by using one piece of the first distribution information among the plurality of pieces of first distribution information generated from the sharing information. For example, the sharing information can be updated by adding a hash value of the one piece of first distribution information to the sharing information. For example, updating of the sharing information can be performed for every session. Each of the authentication device and the authentication target device generates a plurality of pieces of different first distribution information on the basis of the updated sharing information.

According to this, since a plurality of different first distribution information are generated, the first distribution information for authentication can also be made different, and it is possible to reduce a possibility that the information for authentication flowing through a network between the authentication device and the authentication target device has the same content.

In the key sharing method of this embodiment, the authentication device stops authentication of the authentication target device by deleting the first distribution information for authentication which is retained by the authentication device.

The authentication device stops authentication of the authentication target device by deleting the first distribution information for authentication which is retained by the authentication device. In a case where a situation in which authentication of the authentication target device is to be stopped occurs, authentication can be simply stopped.

The authentication method of this embodiment is an authentication method between the authentication device and the authentication target device. The authentication device shares sharing information with the authentication target device in advance, one of the authentication device and the authentication target device shares a generation value generated by a predetermined method with the other of the authentication device and the authentication target device, and each of the authentication device and the authentication target device generates a plurality of pieces of first distribution information from the sharing information by using the generation value with a predetermined encoding method capable of restoring data before distribution by arranging all or a part of a plurality of pieces of distribution data obtained by distributing the data before distribution, and shares one piece of first distribution information among the plurality of pieces of first distribution information as authentication information.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A key sharing method between an authentication device and an authentication target device, comprising:
   sharing, by the authentication device, sharing information with the authentication target device in advance;
   sharing, by one of the authentication device or the authentication target device, a generation value generated by a predetermined method with the other of the authentication device or the authentication target device;
   generating, by each of the authentication device and the authentication target device, a plurality of pieces of first distribution information from the sharing information by using the generation value with a predetermined encoding method capable of restoring data before distribution by arranging all or a part of a plurality of pieces of distribution data obtained by encrypting the data before distribution; and
   sharing, by each of the authentication device and the authentication target device, one piece of first distribution information among the plurality of pieces of first distribution information or derivation information derived from the one piece of first distribution information as a common key.

2. The key sharing method according to claim 1,
   wherein each of the authentication device and the authentication target device encrypts the sharing information by using the generation value as an encryption key, and divides the encrypted sharing information by a predetermined division method to generate the plurality of pieces of first distribution information.

3. The key sharing method according to claim 1,
   wherein each of the authentication device and the authentication target device distributes the sharing information by a secret distribution method by using the generation value as an encryption key to generate the plurality of pieces of first distribution information.

4. The key sharing method according to claim 1,
   wherein each of the authentication device and the authentication target device uses a derivation value that is derived from the generation value by a predetermined derivation method instead of the generation value.

5. The key sharing method according to claim 1,
   wherein the authentication device,
   stores device information including specific information specific to a device,
   encrypts the device information with a first encryption key, and divides the encrypted device information by a predetermined division method to generate a plurality of pieces of second distribution information, and
   shares one piece of second distribution information among the plurality of pieces of second distribution information with the authentication target device as the sharing information.

6. The key sharing method according to claim 1,
wherein the authentication device,
stores device information including specific information specific to a device,
distributes the device information by using a first encryption key by a secret distribution method to generate a plurality of pieces of second distribution information, and
shares one piece of second distribution information among the plurality of pieces of second distribution information with the authentication target device as the sharing information.

7. The key sharing method according to claim 5,
wherein the authentication device,
generates a plurality of pieces of third distribution information from another second distribution information among the plurality of pieces of second distribution information by using the predetermined encoding method and a second encryption key, and
shares one piece of third distribution information among the plurality of pieces of third distribution information with the authentication target device, and
each of the authentication device and the authentication target device,
generates a synthesis value obtained by synthesizing one piece of the third distribution information and one piece of the second distribution information, and
generates the plurality of pieces of first distribution information from the synthesis value by using the generation value by the predetermined encoding method.

8. The key sharing method according to claim 5,
wherein the authentication device is capable of acquiring the device information from an external server.

9. The key sharing method according to claim 1,
wherein each of the authentication device and the authentication target device shares each of parts of the plurality of pieces of first distribution information or each of a plurality of pieces of derivation information derived from the parts of the plurality of pieces of first distribution information as a plurality of different common keys.

10. The key sharing method according to claim 1,
wherein the authentication target device transmits first distribution information for authentication among the plurality of pieces of first distribution information to the authentication device, and
the authentication device authenticates the authentication target device by using the first distribution information for authentication which is transmitted from the authentication target device and the first distribution information for authentication which is retained by the authentication device.

11. The key sharing method according to claim 10,
wherein each of the authentication device and the authentication target device,
updates the sharing information by using one piece of the first distribution information among the plurality of pieces of first distribution information generated from the sharing information, and
generates a plurality of pieces of first distribution information different from the plurality of pieces of first distribution information on the basis of the updated sharing information.

12. The key sharing method according to claim 10,
wherein the authentication device stops authentication of the authentication target device by deleting the first distribution information for authentication which is retained by the authentication device.

13. A key sharing system, comprising:
an authentication device; and
an authentication target device,
wherein the authentication device shares sharing information with the authentication target device in advance,
one of the authentication device or the authentication target device shares a generation value generated by a predetermined method with the other of the authentication device or the authentication target device, and
each of the authentication device and the authentication target device includes a processor configured to function as:
a distribution information generation unit that generates a plurality of pieces of first distribution information from the sharing information by using the generation value with a predetermined encoding method capable of restoring data before distribution by arranging all or a part of a plurality of pieces of distribution data obtained by encrypting the data before distribution, and
a common key generation unit that generates (i) one piece of first distribution information among the plurality of pieces of first distribution information or (ii) derivation information derived from the one piece of first distribution information, as a common key between the authentication device and the authentication target device.

14. An authentication device that shares sharing information and a generation value generated by a predetermined method with an authentication target device, the authentication device comprising a processor configured to function as:
a distribution information generation unit that generates a plurality of pieces of first distribution information from the sharing information by using the generation value with a predetermined encoding method capable of restoring data before distribution by arranging all or a part of a plurality of pieces of distribution data obtained by encrypting the data before distribution, and
a common key generation unit that generates (i) one piece of first distribution information among the plurality of pieces of first distribution information or (ii) derivation information derived from the one piece of first distribution information, as a common key with the authentication target device.

15. An authentication target device that shares sharing information and a generation value generated by a predetermined method with an authentication device, the authentication target device comprising a processor configured to function as:
a distribution information generation unit that generates a plurality of pieces of first distribution information from the sharing information by using the generation value with a predetermined encoding method capable of restoring data before distribution by arranging all or a part of a plurality of pieces of distribution data obtained by encrypting the data before distribution, and
a common key generation unit that generates one piece of first distribution information among the plurality of pieces of first distribution information or derivation information derived from the one piece of first distribution information as a common key with the authentication device.

16. A computer readable non-transitory recording medium recording a computer program that causes a computer to execute:
- processing of sharing sharing information and a generation value generated by a predetermined method with an authentication target device;
- processing of generating a plurality of pieces of first distribution information from the sharing information by using the generation value with a predetermined encoding method capable of restoring data before distribution by arranging all or a part of a plurality of pieces of distribution data obtained by encrypting the data before distribution; and
- processing of generating (i) one piece of first distribution information among the plurality of pieces of first distribution information or (ii) derivation information derived from the one piece of first distribution information, as a common key with the authentication target device.

17. A computer readable non-transitory recording medium recording a computer program that causes a computer to execute:
- processing of sharing sharing information and a generation value generated by a predetermined method with an authentication device;
- processing of generating a plurality of pieces of first distribution information from the sharing information by using the generation value with a predetermined encoding method capable of restoring data before distribution by arranging all or a part of a plurality of pieces of distribution data obtained by encrypting the data before distribution; and
- processing of generating (i) one piece of first distribution information among the plurality of pieces of first distribution information or (ii) derivation information derived from the one piece of first distribution information, as a common key with the authentication device.

18. An authentication method between an authentication device and an authentication target device, comprising:
- sharing, by the authentication device, sharing information with the authentication target device in advance;
- sharing, by one of the authentication device or the authentication target device, a generation value generated by a predetermined method with the other of the authentication device or the authentication target device;
- generating, by each of the authentication device and the authentication target device, a plurality of pieces of first distribution information from the sharing information by using the generation value with a predetermined encoding method capable of restoring data before distribution by arranging all or a part of a plurality of pieces of distribution data obtained by encrypting the data before distribution; and
- sharing, by each of the authentication device and the authentication target device, one piece of first distribution information among the plurality of pieces of first distribution information as authentication information.

* * * * *